(12) United States Patent

Turner

(10) Patent No.: US 12,679,137 B2

(45) Date of Patent: Jul. 14, 2026

(54) WHEEL RESTRAINING APPARATUS FOR A TRAILER AXLE

(71) Applicant: WheelSafe Technology, Inc., Yukon, OK (US)

(72) Inventor: William E. Turner, Yukon, OK (US)

(73) Assignee: WheelSafe Technology, Inc., Yukon, OK (US)

( * ) Notice: Subject to any disclaimer, the term of this patent is extended or adjusted under 35 U.S.C. 154(b) by 365 days.

(21) Appl. No.: 18/416,132

(22) Filed: Jan. 18, 2024

(65) Prior Publication Data

US 2025/0236136 A1 Jul. 24, 2025

(51) Int. Cl.
*B60B 27/00* (2006.01)

(52) U.S. Cl.
CPC ................................ *B60B 27/0078* (2013.01)

(58) Field of Classification Search
CPC ........ B60B 27/0078; B60B 2900/3312; B60B 7/16; B60B 35/04; B60B 35/08; B60B 35/16; Y10T 70/5863; Y10T 70/5571; Y10T 70/5987
USPC ...................................................... 301/124.1
See application file for complete search history.

(56) References Cited

U.S. PATENT DOCUMENTS

| | | | | |
|---|---|---|---|---|
| 3,486,797 A | | 12/1969 | Osborne | |
| 3,795,408 A | * | 3/1974 | Nemessanyi | .......... B60K 23/06 |
| | | | | 280/80.1 |
| 3,944,285 A | * | 3/1976 | Vincent | ..................... B60B 3/14 |
| | | | | 403/258 |

| | | | | |
|---|---|---|---|---|
| 5,431,485 A | | 7/1995 | Hayashi | |
| 5,560,687 A | | 10/1996 | Hagelthorn | |
| 5,795,037 A | | 8/1998 | Hagelthorn | |
| 5,887,952 A | | 3/1999 | Gandellini | |
| 5,954,151 A | | 9/1999 | Cochrane et al. | |

(Continued)

FOREIGN PATENT DOCUMENTS

| | | | | |
|---|---|---|---|---|
| DE | 112016005502 B4 | * | 6/2022 | ............. B60B 35/04 |
| EP | 0931674 | | 7/1999 | |

(Continued)

OTHER PUBLICATIONS

International Search Report and Written Opinion; Apr. 29, 2025; 10 pgs.

(Continued)

*Primary Examiner* — S. Joseph Morano
*Assistant Examiner* — Eva L Comino
(74) *Attorney, Agent, or Firm* — Dunlap Codding, P.C.

(57) ABSTRACT

An apparatus for restraining wheel assemblies mounted on an axle assembly. The apparatus comprises a tether assembly and a tensioning mechanism. The tether assembly is extendible through a passage of an axle body and comprises a flexible cable, a first cable end attached to one end of the cable, and a second cable end attached to the other end of the cable. The tensioning mechanism is coupled to the second cable end and includes a first wheel threadingly connected to the second cable end, and a second wheel rotatably coupled to the first wheel in a way that rotation of the second wheel imparts rotational movement to the first wheel to cause the second cable end to move axially away from the first cable end until a preselected tension is applied to the cable upon which the second wheel freewheels relative to the first wheel.

20 Claims, 15 Drawing Sheets

(56)                References Cited

U.S. PATENT DOCUMENTS

| | | | | | |
|---|---|---|---|---|---|
| 6,000,763 | A | * | 12/1999 | Stevens | B60B 27/001 |
| | | | | | 301/124.1 |
| 6,070,893 | A | | 6/2000 | Thorndyke et al. | |
| 6,106,076 | A | | 8/2000 | Gandellini | |
| 7,000,995 | B2 | | 2/2006 | Hagelthorn | |
| 7,228,932 | B2 | | 6/2007 | Rosenthal et al. | |
| 7,547,077 | B2 | | 6/2009 | Melberg et al. | |
| 7,922,258 | B2 | | 4/2011 | Baumann | |
| 9,970,486 | B2 | | 5/2018 | Hagelthorn | |
| 10,112,436 | B2 | | 10/2018 | Denmead et al. | |
| 10,987,973 | B2 | * | 4/2021 | Turner | B60B 35/08 |
| 11,084,324 | B2 | * | 8/2021 | Turner | B60B 35/04 |
| 12,128,708 | B2 | | 10/2024 | Turner | |
| RE50,706 | E | * | 12/2025 | Turner | B60B 35/04 |
| 2003/0015909 | A1 | | 1/2003 | Meek, Jr. | |
| 2010/0266331 | A1 | | 10/2010 | Peterkort | |
| 2013/0213764 | A1 | | 8/2013 | Lawless et al. | |
| 2023/0091889 | A1 | * | 3/2023 | Turner | B60C 23/00336 |
| | | | | | 301/5.24 |

FOREIGN PATENT DOCUMENTS

| | | | |
|---|---|---|---|
| JP | 2006143063 | | 6/2006 |
| JP | 2006143063 A | * | 6/2006 |
| WO | WO95/05291 | | 2/1995 |

OTHER PUBLICATIONS

Notice of Allowance for U.S. Appl. No. 16/432,432 dated Jan. 14, 2021; 6 pgs.

Park, Jim; "Why do wheels come off trucks?", Oct. 7, 2013; retrieved Dec. 19, 2018 from https://www.truckinginfo.com.; 22 pgs.

Crosby Group LLC; "Angular Contact Bearing Swivels"; 2017; 1 pg.

ESCO Corp.; "Rigging Products Specifications"; P7000RIGOILO112; 44 pgs.

Hanes Supply Inc.; "Section 3: Wire Rope Assembly and Fittings", 20 pgs.

Hendrickson; "Technical Procedure: Trailer suspension systems standard wheel service wheel-end"; Mar. 2018; Document LIT No. L496; Revision 1; 20 pgs.

Park, Jim; "Keeping your wheels on"; Oct. 15, 2013, retrieved Dec. 19, 2018 from https://www.truckinginfo.com.; 22 pgs.

Monster, R. F.; "Wheel separations from commercial vehicles: Experiences in Ontario"; 2004; Proceedings of the Canadian Multidisciplinary Road Safety Conference XIV; 13 pgs.

National Transportation Safety Board; "Safety Recommendation"; Oct. 23, 1992; retrieved from https://www.ntsb.gov/safety/safety-recs/recletters/H92_98_101; 6 pgs.

PWB Anchor; "Product Catalogue—2014 Edition"; Vis Automation Service; "Squirrel Wheel Safety Device"; retrieved Dec. 26, 2018 from http://demarytruck.com/tire-squirrel/; 6 pgs.

The Cable Connection; "Wire Rope Assemblies and Fittings"; 2009; 40 pgs.

GMB; "Wheel bearing parts"; retrieved on Jul. 14, 2019 from https://www.gmb.jp.; 4 pgs.

* cited by examiner

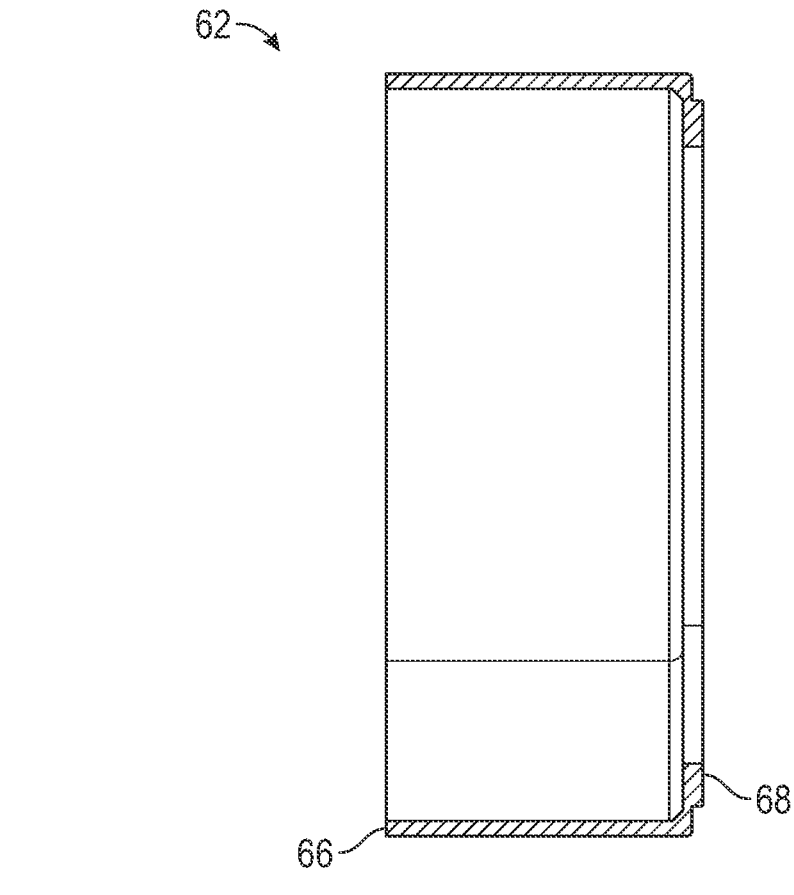
FIG. 11
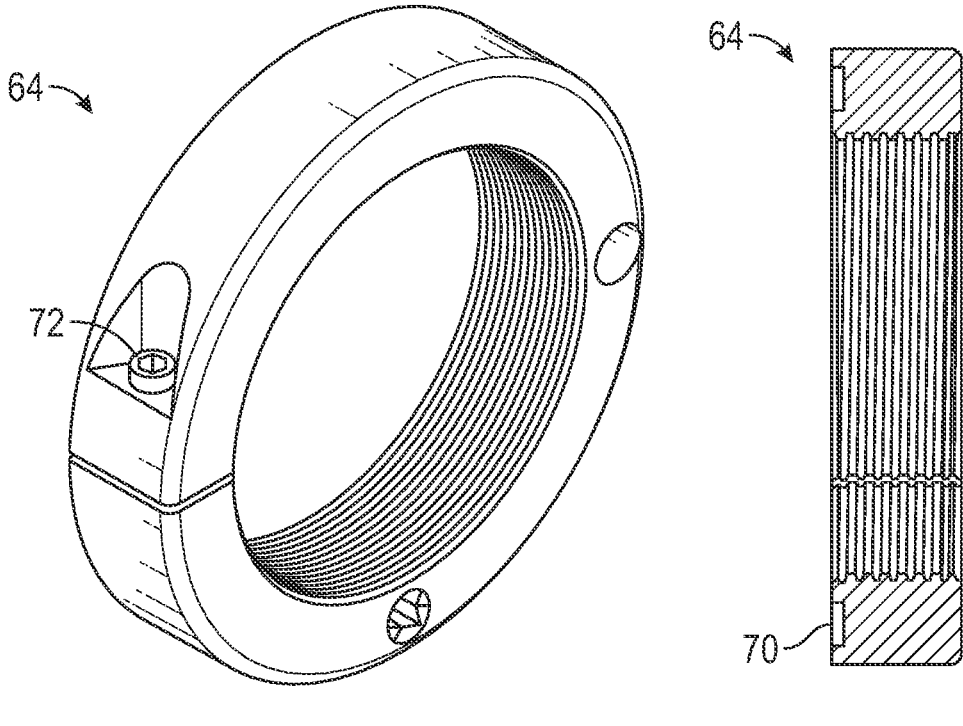
FIG. 12A                    FIG. 12B

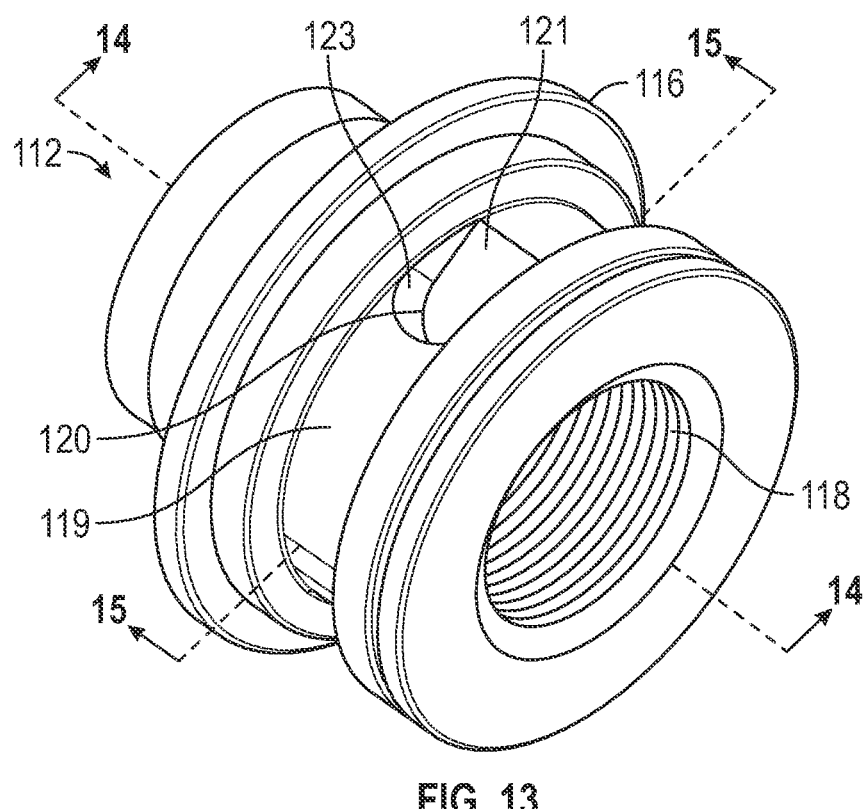
FIG. 13
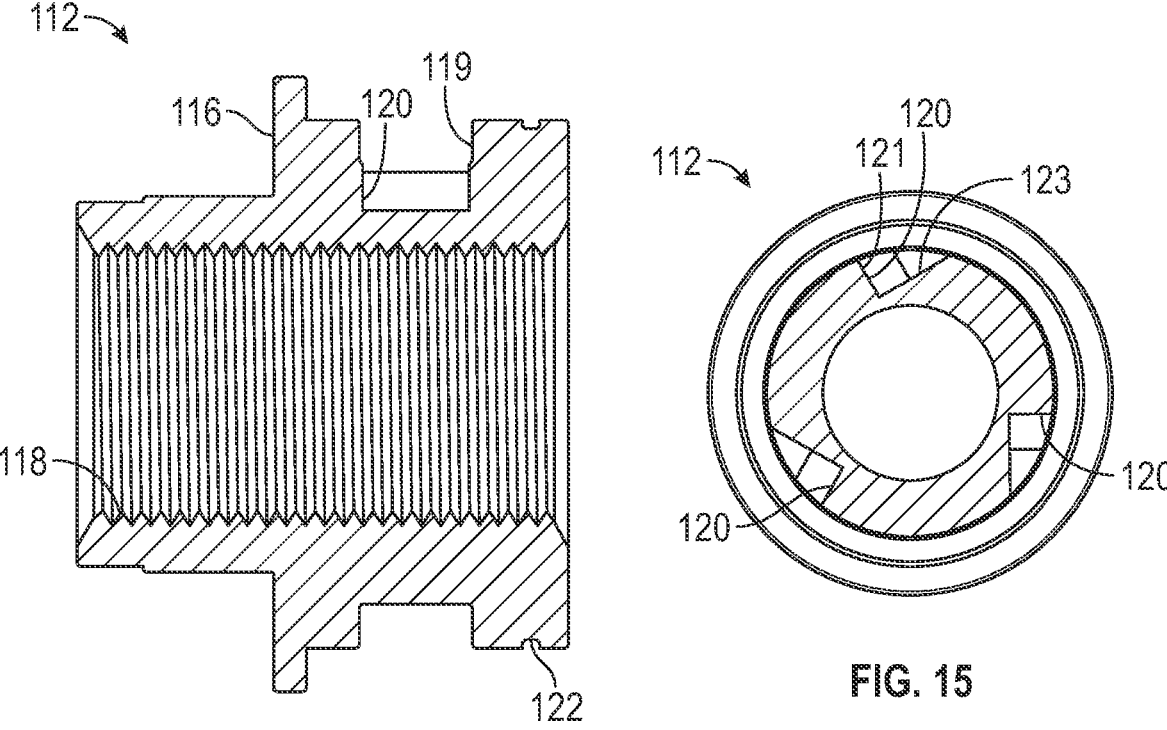
FIG. 14
FIG. 15

114

114

130

126

128

WHEEL RESTRAINING APPARATUS FOR A TRAILER AXLE

BACKGROUND

Trucks play a crucial role in the transportation industry, facilitating the movement of goods across vast distances. These vehicles typically comprise a tractor unit and one or more trailers, with the trailers including one or more axle assemblies for supporting wheel assemblies that must support significant loads during operation. The reliability and safety of these vehicles are contingent upon the proper functioning of numerous components, with the axle and wheel assemblies being of paramount importance. Within those assemblies, bearing and stud failures pose significant challenges in the operation of tractor-trailers.

Wheel bearings are critical elements in supporting and facilitating the rotation of the wheel hub around the axle, ensuring smooth and controlled movement of the vehicle. The failure of wheel bearings can result in increased friction, heat generation, and ultimately, compromised structural integrity, which can lead to the detachment of the hub along with the wheel assembly. Similarly, wheel studs are essential for securing the wheel to the hub, and their failure can lead to the detachment of the wheel from the hub.

The consequences of wheel bearing and wheel stud failures are particularly severe in the context of tractor-trailers, given their substantial size and weight. The dislodgment of tires not only poses a threat to the safety of the vehicle's occupants but also endangers other road users. Incidents of tire dislodgment can lead to accidents, property damage, and, in extreme cases, loss of life.

Existing solutions in the field often fall short of addressing these challenges comprehensively. While routine maintenance and inspections are essential, they do not eliminate the inherent vulnerabilities associated with conventional wheel assemblies. Therefore, a need exists for an innovative wheel restraining apparatus for a trailer axle that can enhance the reliability and safety of tractor-trailers by minimizing the risk of wheel bearing and wheel stud failures and mitigating the potential for tire dislodgment. It is to such an apparatus that the inventive concepts disclosed herein are directed.

BRIEF DESCRIPTION OF THE DRAWINGS

FIG. 11 is a cross-sectional view of the wheel retainer of FIG. 10.

FIG. 12A is a perspective view of a wheel retainer nut.

FIG. 12B is a cross-sectional view of the wheel retainer nut of FIG. 12A.

FIG. 13 is a perspective view of a first wheel of a tensioning mechanism.

FIG. 14 is a cross-sectional view taken along line 14-14 of FIG. 13.

FIG. 15 is a cross-sectional view taken along line 15-15 of FIG. 13.

DETAILED DESCRIPTION OF EXEMPLARY EMBODIMENTS

Figure 1:
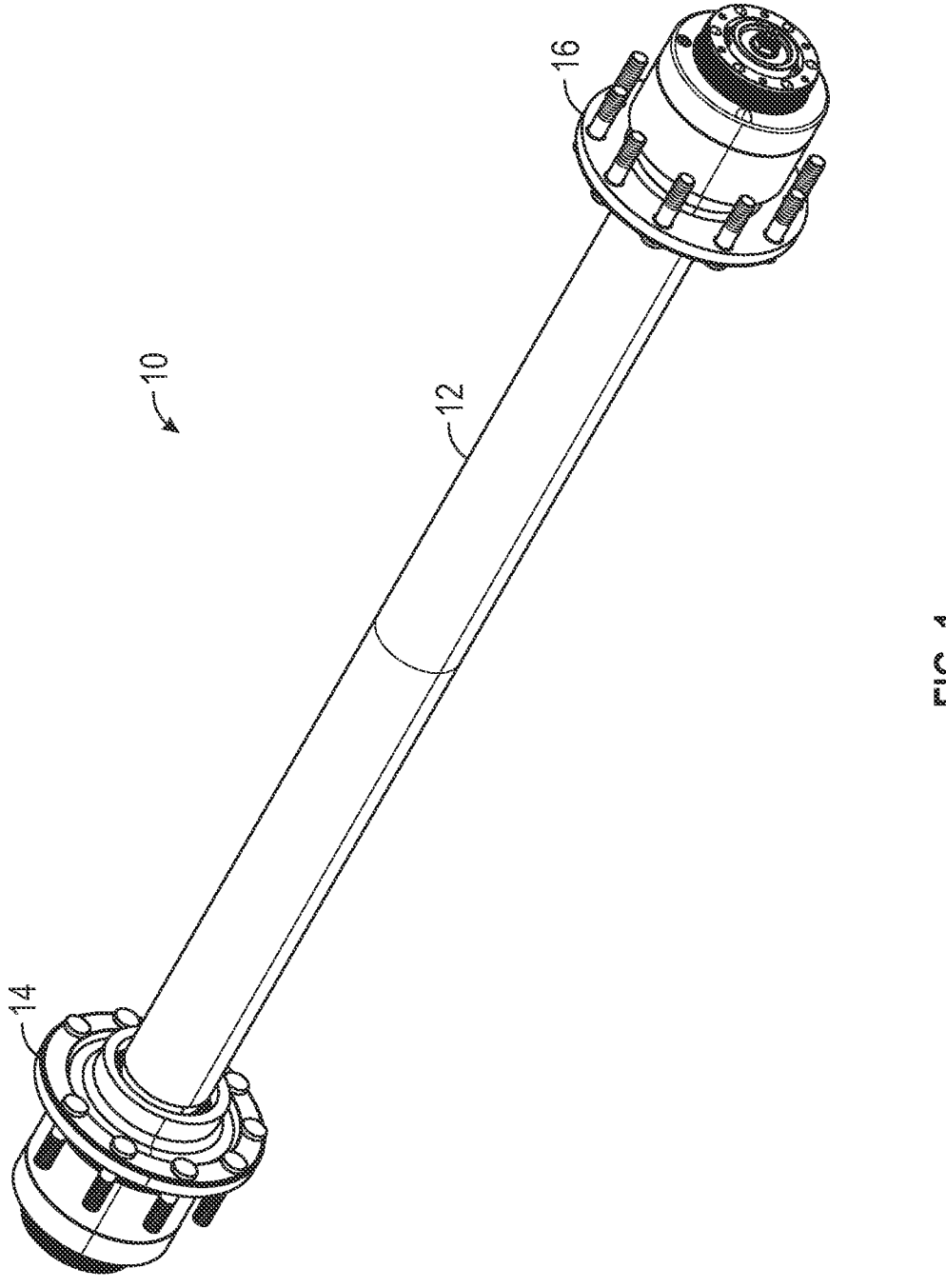
FIG. 1 is a perspective view of an axle assembly constructed in accordance with the inventive concepts disclosed herein.

The inventive concepts disclosed are generally directed to an apparatus for restraining at least a first wheel assembly and a second wheel assembly mounted on an axle assembly. The axle assembly comprises an axle body with a first end, a second end, and a passage extending through the axle body from the first end to the second end; a first wheel end assembly rotatably mounted on the first end of the axle body; and a second wheel end assembly rotatably mounted on the second end of the axle body. Each of the first wheel end assembly and the second wheel assembly has a hub member rotatably connected to the axle body. The first wheel assembly is mountable on the first wheel end assembly and the second wheel assembly is mountable on the second wheel end assembly.

The apparatus comprises a tether assembly and a tensioning mechanism. The tether assembly is extendible through the passage of the axle body and comprises a flexible cable having a first end and a second end, a first cable end attached to the first end of the cable with at least a portion of the first cable end being extendible beyond the hub member of the first wheel end assembly, and a second cable end attached to the second end of the cable with at least a portion of the second anchor member being extendible beyond the hub member of the second wheel end assembly. The first cable end is securable to the hub member of the first wheel end assembly.

The tensioning mechanism is coupled to the second cable end and comprises a first wheel threadingly connected to the second cable end, and a second wheel rotatably coupled to the first wheel in a way that rotation of the second wheel imparts rotational movement to the first wheel to cause the second cable end to move axially away from the first cable end until a preselected tension is applied to the cable upon which the second wheel freewheels relative to the first wheel.

Before explaining at least one embodiment of the inventive concepts disclosed herein in detail, it is to be understood that the inventive concepts are not limited in their application to the details of construction, experiments, exemplary data, and/or the arrangement of the components set forth in the following description, or illustrated in the drawings. The presently disclosed and claimed inventive concepts are capable of other embodiments or of being practiced or carried out in various ways. Also, it is to be understood that the phraseology and terminology employed herein is for the purpose of description only and should not be regarded as limiting in any way.

In the following detailed description of embodiments of the inventive concepts, numerous specific details are set forth in order to provide a more thorough understanding of the inventive concepts. However, it will be apparent to one of ordinary skill in the art that the inventive concepts within the disclosure may be practiced without these specific details. In other instances, well-known features have not been described in detail to avoid unnecessarily complicating the instant disclosure.

Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the inventive concepts. This description should be read to include one or at least one and the singular also includes the plural unless it is obvious that it is meant otherwise.

Figure 2:
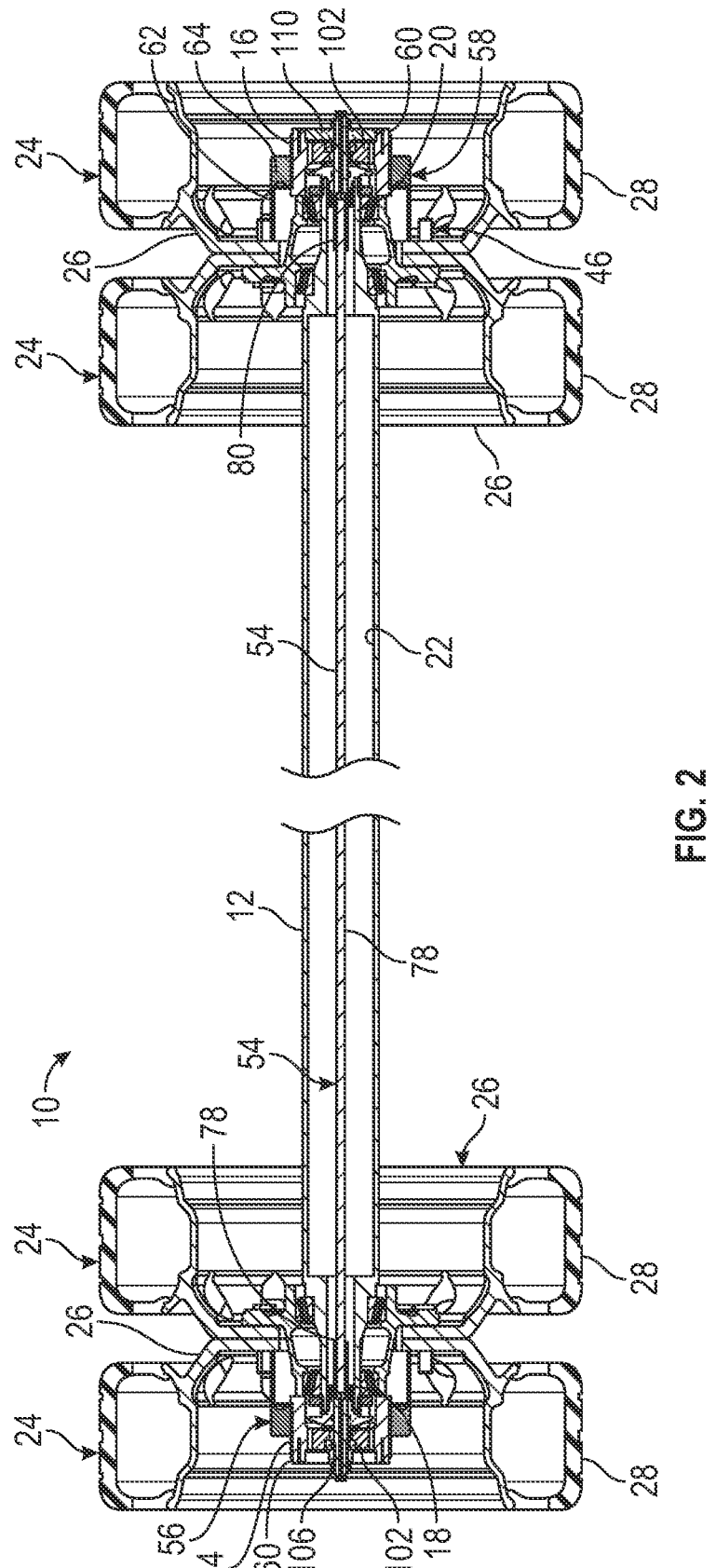
FIG. 2 is a cross-sectional view of the axle assembly of FIG. 1 shown with a plurality of wheel assemblies mounted thereon and an apparatus for restraining the wheel assemblies.

With reference now to FIGS. 1 and 2, an axle assembly 10 constructed in accordance with the inventive concepts disclosed and claimed herein is illustrated. The assembly is secured to a trailer frame (not shown) with brackets (also not shown). The design and placement of the brackets depend on the specific configuration and of the axle assembly 10. Broadly, the axle assembly 10 includes an axle body 12 (also known as an axle beam or tube), a first wheel end assembly 14 rotatably mounted on one end of the axle body 12, and a second wheel end assembly 16 rotatably mounted on another end of the axle body 12.

The axle body 12 is generally tubular and has a first end 18, a second end 20, and a passage 22 extending through the axle body 12 from the first end 18 to the second end 20. The first end 18 and the second end 20 may be of reduced diameter relative to a central portion of the axle body 12, and may be referred to as a spindle.

The first wheel end assembly 14 and the first wheel end assembly 16 are configured to receive one or more wheel assemblies 24. The wheel assemblies 24 may include a wheel or rim 26 on which a pneumatic tire 28 is mounted.

Figure 4:
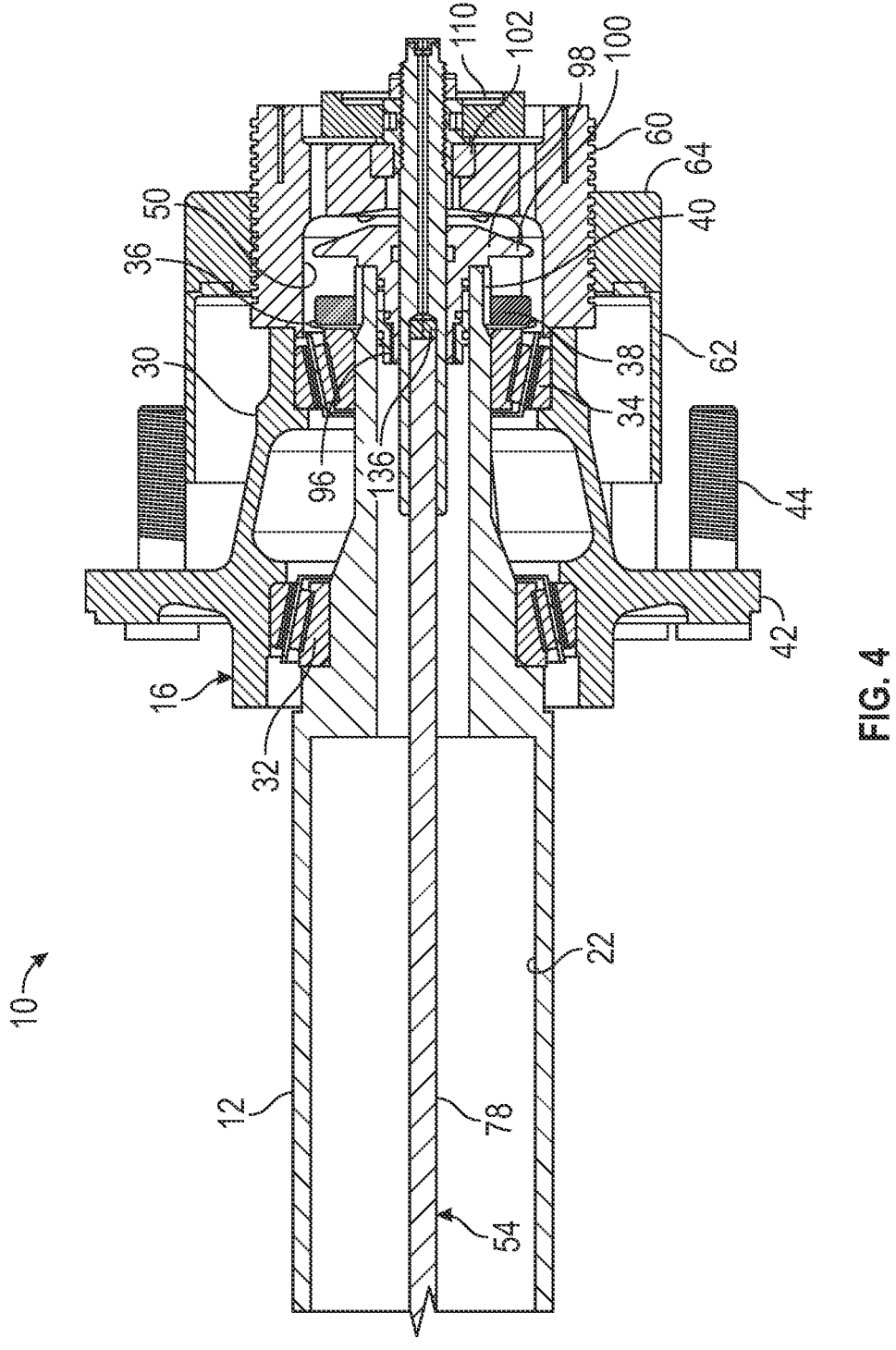
FIG. 4 is a cross-sectional view of the right end of the axle assembly of FIG. 3.
Figure 5:
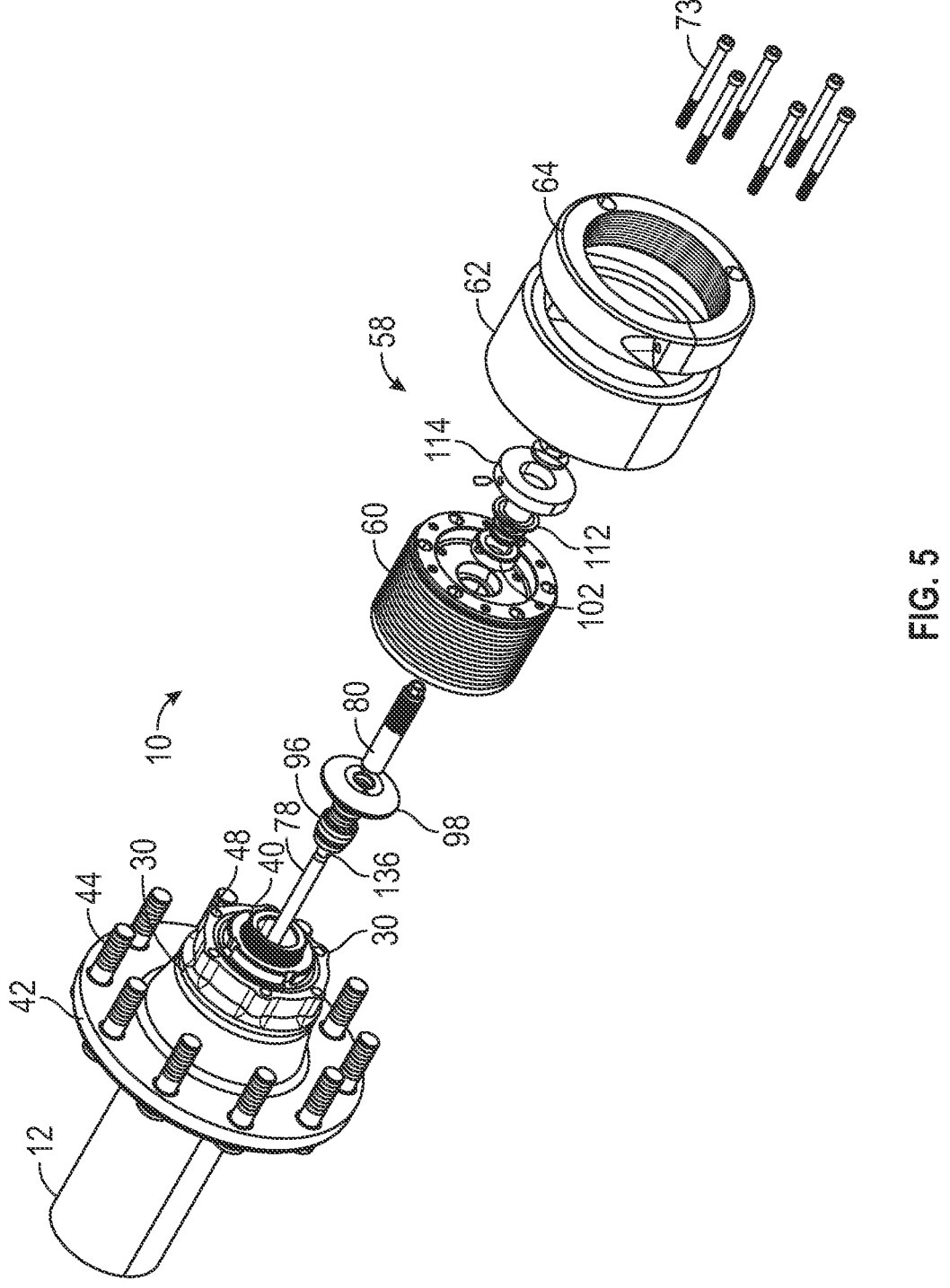
FIG. 5 is an exploded, perspective view of the right end of the axle assembly of FIG. 3.

The first wheel end assembly 14 and the first wheel end assembly 16 are similar in construction, so for the sake of brevity, only the second wheel end assembly 16 will be described in detail with reference to FIGS. 3-5. The second wheel end assembly 16 includes a main hub 30 mounted on the second end 20 of the axle body 12 with an inboard bearing assembly 32 and an outboard bearing assembly 34. In a manner well known, a lock washer 36 and a spindle nut 38 are threaded to a threaded end 40 (best shown in FIG. 5) of the axle body 12 and engage the outboard bearing assembly 34 to secure the main hub 30, the inboard bearing assembly 32, and the outboard bearing assembly 34 to the axle body 12.

The main hub 30 is configured to receive a brake assembly (not shown) and the one or more wheel assemblies 24.

The main hub 30 has a flange portion 42 having a plurality of studs 44 extending therefrom. In one embodiment, a pair of the wheel assemblies 24 (FIG. 2) are mounted on the main hub 30 in a back-to-back relationship and secured to the flange portion 42 with the studs 44 and a plurality of lug nuts 46. A front end of the main hub 30 may be provided with a plurality of threaded holes 48 (FIG. 5) to enable a hub cap or dust cap (not shown) to be secured to the main hub 30.

In all cases, the first wheel end assembly 14 and the first wheel end assembly 16 include a lubrication chamber 50 (FIG. 4) between the axle body 12 and the main hub 30 to contain lubricant for the inboard bearing assembly 32 and the outboard bearing assembly 34. In a conventional axle assembly, this may require plugging the passage 22 of the axle body 12 and covering the end of the axle body 12 with a hubcap or dust cover attached to the main hub 30. The integrity of the lubrication chamber 50 is essential in maintaining the operability and life of the wheel end assemblies.

As previously described, the consequences of wheel bearing and wheel stud failures are particularly severe in the context of tractor-trailers. The dislodgment of tires not only poses a threat to the safety of the vehicle's occupants but also endangers other road users. While routine maintenance and inspections are essential, they do not eliminate the inherent vulnerabilities associated with conventional wheel assemblies. To this end, the axle assembly 10 further comprises a first wheel retaining assembly 56, a second wheel retainer assembly 58, and a tether assembly 54 to enhance the reliability and safety of tractor-trailers by minimizing the risk of wheel stud and wheel bearing failures and mitigating the potential for tire dislodgment. The first wheel retainer assembly 56, the second wheel retainer assembly 58, and the tether assembly 54 described herein may be retrofitted to previously existing axle assemblies or alternatively may be manufactured in connection with new axle assemblies. Also, it will be understood that the axle assembly 10 may be implemented with the first wheel retaining assembly 56 and the second wheel retaining assembly 58 but without the tether assembly 54, and the axle assembly 10 may be implemented with the tether assembly 54 but without the first wheel retaining assembly 56 and the second wheel retaining assembly 58.

For the purpose of this disclosure, the first wheel retainer assembly 56 is considered a part of the first wheel end assembly 14, and the second wheel retainer assembly 58 is considered a part of the first wheel end assembly 16. Because the first wheel retainer assembly 56 is identical in construction to the second wheel retainer assembly 58, only the second wheel retainer assembly 58 will be described in detail with reference to FIGS. 2-5 and 8-12.

The second wheel retainer assembly 58 includes a hub member 60, a wheel retainer 62, and a wheel retainer nut 64. The hub member 60 is coaxially connected to the main hub 30 such that the hub member 60 serves as an extension of the main hub 30. The hub member 60 is generally cylindrically shaped with a hollow interior 63 forming a portion of the lubrication chamber 50. The hub member 60 has a central bore 65 with a recess 67, which will be sealed in the manner described below to maintain the integrity of the lubrication chamber 50 with respect to the passage 22 of the axle body 12. The hub member 60 has an outer periphery 69 that is threaded, and the hub member 60 has a plurality of holes 71 corresponding with the threaded holes 48 of the main hub 30. A plurality of fasteners 73 (FIG. 5) may be used to secure the hub member 60 to the main hub 30. The hub member 60 may have a set of holes 75 that extend through the hub member 60 and are circumferentially spaced. The holes 75 permit lubricant to pass through the hub member 60. Finally, the hub member 60 may have a set of holes 77 for securing a hubcap or dust cover (not shown) to the hub member 60. Such hubcap or dust cover will function to define the lubrication chamber 50. The hub cap or dust cover may have a sight glass for visually monitoring the level of the lubricant in the lubricant chamber 50.

The wheel retainer 62 is generally cylindrically shaped and positionable over the main hub 30. One end of the wheel retainer 62 has an annular rim 66 so the annular rim 66 of the wheel retainer 62 is engageable with the wheel assemblies 24 when the wheel assemblies 24 (as shown in FIG. 2) are mounted on the main hub 30. Another end of the wheel retainer 62 has an annular lug 68 for engagement with first wheel retainer nut 64.

The wheel retainer nut 64 is generally ring-shaped and threadingly engageable with the threads of the hub member 60 so the wheel retainer 62 is securable between the wheel assemblies 24 and the first wheel retaining nut 64. The wheel retainer nut 64 has an annular recess 70 matable with the lug 68 of the wheel retainer 62. In one embodiment, the wheel retainer nut 64 is a split-ring. The split-ring may be secured together with a fastener, such as a fastener 72, thereby securing the wheel retainer nut 64 to the hub member 60.

The first wheel retainer assembly 56 is secured to the main hub 30 of the first wheel end assembly 14 in a similar fashion.

Figure 6:
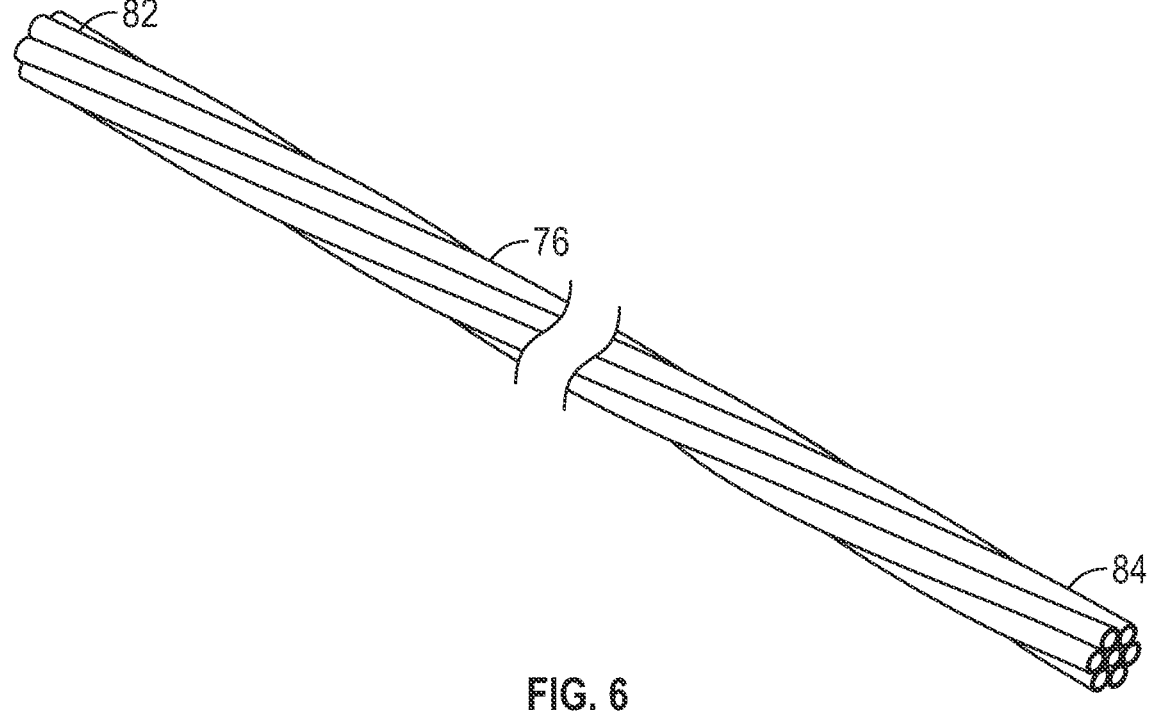
FIG. 6 is a perspective view of a cable.

Referring to FIG. 2, the tether assembly 54 extends through the passage 22 of the axle body 12 and is connected to each of the hub members 60 to interconnect the hub members 60. The tether assembly 54 includes a cable 76, a first cable end 78, and a second cable end 80. The cable 76 (FIG. 6) is generally flexible and has a first end 82 and a second end 84. The cable 76 may be formed of various diameters and from various structures and materials, such as a rod, chain, rope, or combinations thereof. In one embodiment, the cable 76 may be a steel wire rope. For example the wire rope may be ½ inch, 7×7 stainless steel wire rope.

Figure 7:
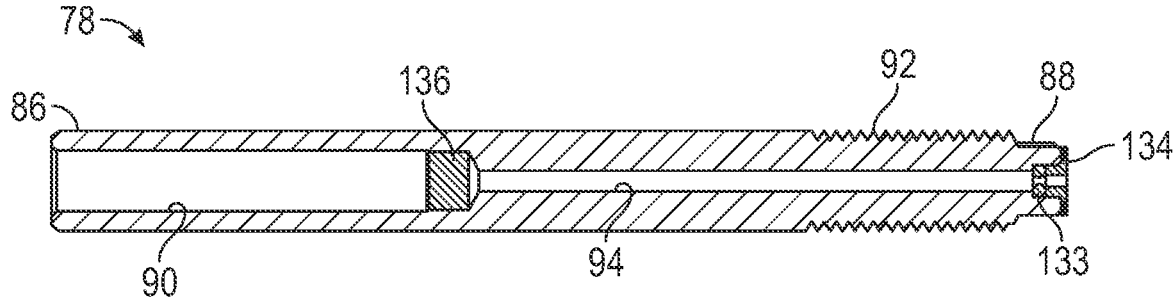
FIG. 7 is a cross-sectional view of a cable end.
Figure 8:
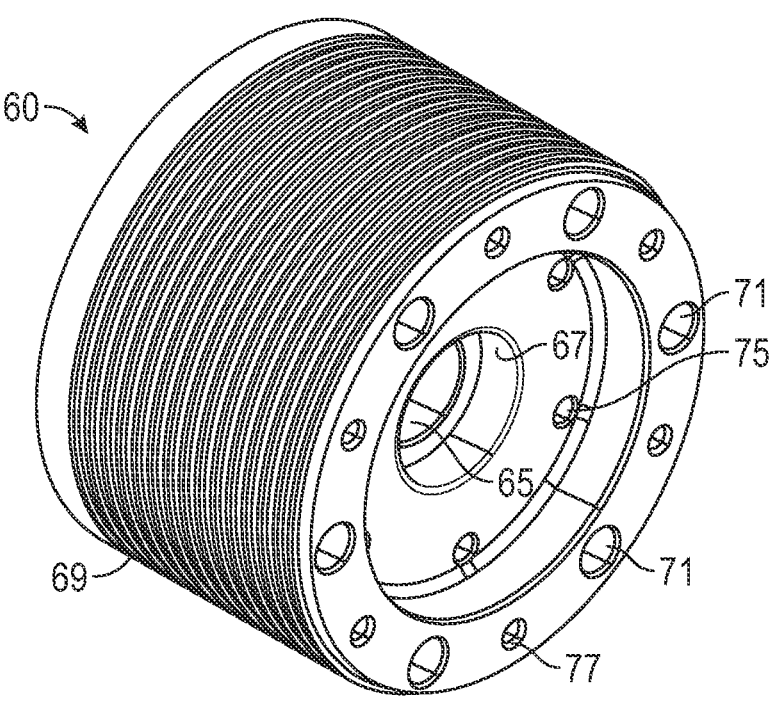
FIG. 8 is an elevational view of a hub member.
Figure 9:
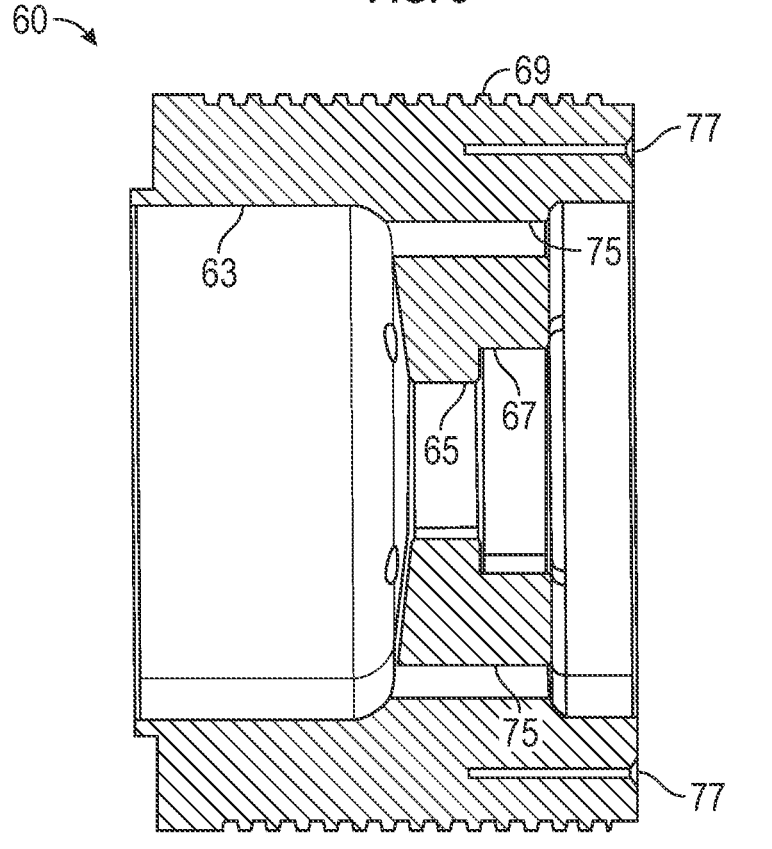
FIG. 9 is a cross-sectional view of the hub member of FIG. 8.
Figure 10:
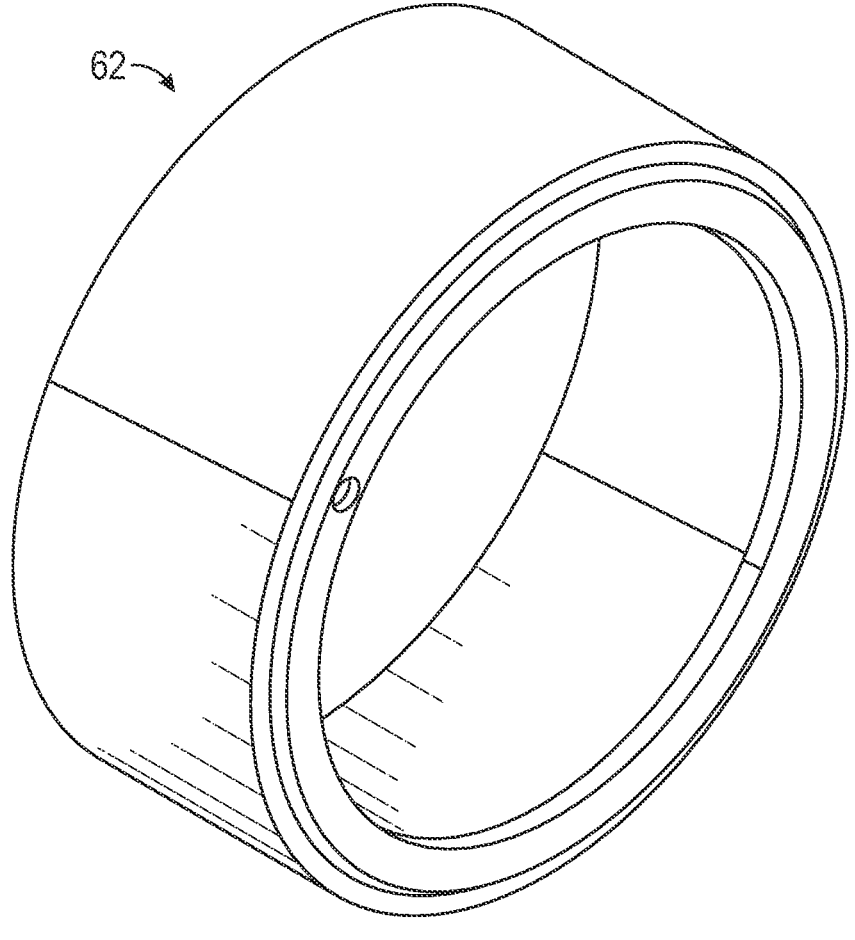
FIG. 10 is a front elevational view of a wheel retainer.

Referring now to FIG. 7, the first cable end 78 is an elongated member with a first end 86 and a second end 88. The first end 86 has a bore 90 for receiving the first end 82 of the cable 76. In one embodiment, the first end 86 of the first cable end 78 is secured to the first end 82 of the cable 76 by crimping the first end 86 of the first cable end 78. The second end 84 of the first cable end 78 has exterior threads 92 for securing the first cable end 78 to the first wheel end assembly 14. The first cable end 78 may have a passage 94 extending through the first cable end 78 from the first end 86 to the second end 88, so the passage 94 of the first cable end 78 is in fluid communication with the passage 22 of the axle body 12. The passage 94 of the first cable end 78 may be used to transport pressurized air from a pressurized air source to the tires 28 in a manner described below.

To maintain the integrity of the lubrication chamber 50 and any source of pressurized air, the first cable end 78 is fluidically sealed relative to the axle body 12. In one embodiment, the first cable end 78 and the axle body 12 are sealed with a combination of a stop plug 96 and a seal carrier 98 in a way that a fluid seal is formed between the interior (i.e., the passage 22) of the axle body 12 and the first cable end 78, and the first cable end 78 is axially slidable relative to the axle body 12 to permit tensioning of the tether assembly 54. The seal carrier 98 is threadingly mated with the stop plug 96. In one embodiment, the seal carrier 98 and the stop plug 96 of the first wheel end assembly 14 may be provided with right-hand threads, and the seal carrier 98 and the stop plug 96 of the second wheel end assembly 17 may be provided with left-hand threads. The seal carrier 98 may include a flange or shoulder 100 (FIG. 4) dimensioned to extend outwardly so as to be positioned adjacent to the end of the axle body 12 and the spindle nut 38 and thereby form a barrier to the dislodgment of the spindle nut 38 from the axle body 12.

The first cable end 78 is also fluidically sealed relative to the hub member 60. In one embodiment, the first cable end 78 and the hub member 60 are sealed with a thrust bearing 102 and an alignment washer 104 (FIG. 2), so the hub member 60 is rotatable relative to the first cable end 78. The first cable end 78 may be secured to the first hub member 60 with a suitable fastener, such as a locking nut 106.

The second cable end 80 is similar in construction to the first cable end 78 and is sealed and connected to the second end 20 of the axle body 12 and the hub member 60 of the second wheel retainer assembly 58 in a similar manner except as described below.

Figure 3:
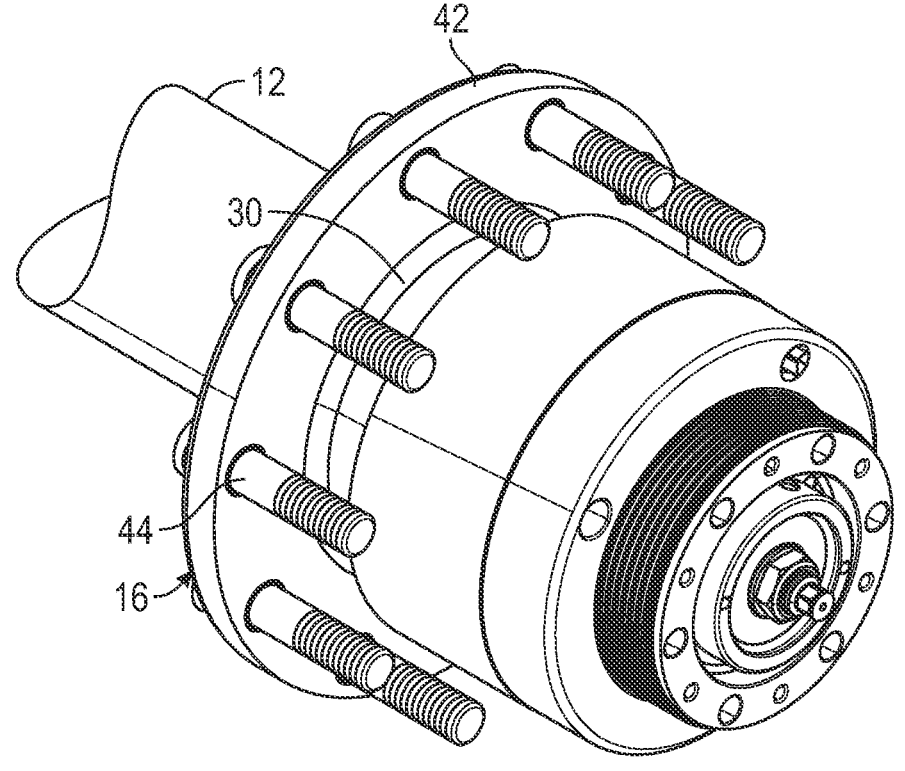
FIG. 3 is a perspective view of the right end of the axle assembly of FIG. 1.

Referring to FIGS. 2 and 3, a tensioning mechanism 110 is coupled to the second cable end 80. The tensioning mechanism 110 includes a first wheel 112 threadingly connected to the second cable end 80 and a second wheel 114 rotatably coupled to the first wheel 112 in a way that rotation of the second wheel 114 imparts rotational movement to the first wheel 112 to cause the second cable end 80 to move axially away from the first cable end 78 until a preselected tension is applied to the cable 76 upon which the second wheel 114 freewheels relative to the first wheel 112.

Referring now to FIGS. 13-15 and 18, the first wheel 112 is ring-shaped with a flanged portion 116, an inner threaded surface 118, and an annular outer groove 119. The inner threaded surface 118 mates with the exterior threads 92 of the second cable end 80 and the flanged portion 116 engages the thrust bearing 102. The annular groove 120 is provided with a plurality of recesses 120 spaced circumferentially around the first wheel 112. The first wheel 112 is illustrated to have three recesses 120, but the number and spacing of the recesses may vary. The recesses 120 may have an angled portion 121 and a radially extending portion 123. Alternatively, the recesses 120 may be holes of a desired shape. The first wheel 112 may further have an annular groove 122 opposite the flanged end 116 for receiving a locking ring 124.

Figures 16, 17:
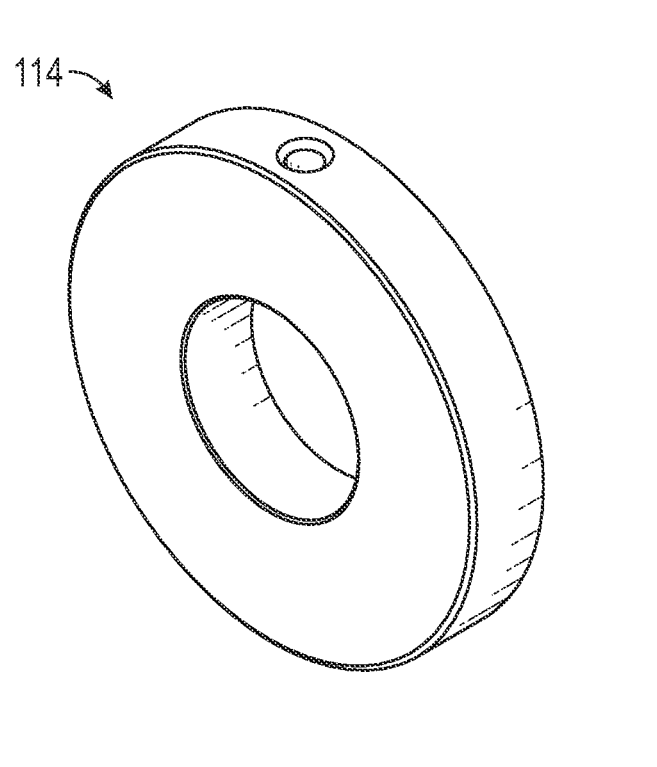
FIG. 16 is a perspective view of a second wheel of a tensioning mechanism.
FIG. 17 is a cross-sectional view of the second wheel of FIG. 16.
Figure 18:
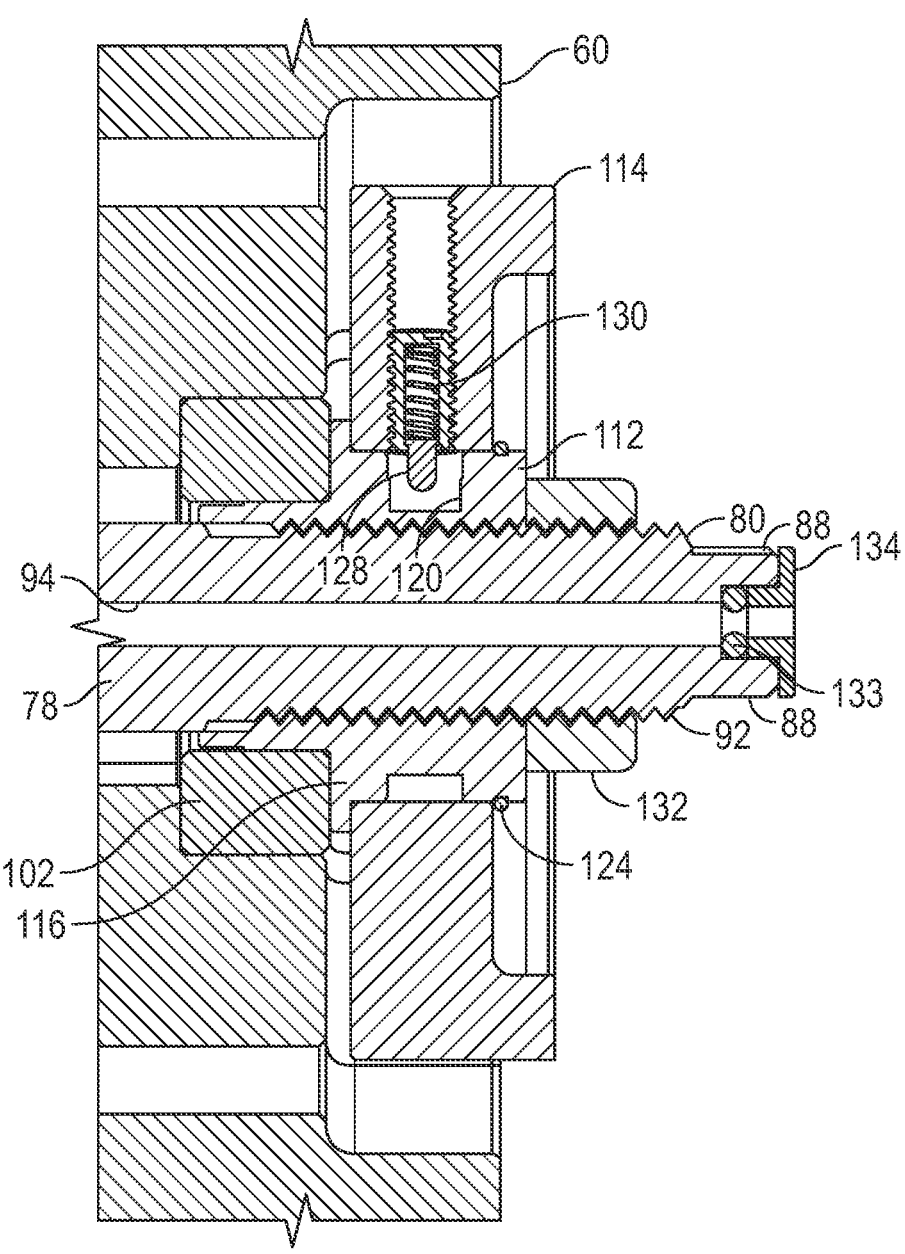
FIG. 18 is a cross-sectional view of the tensioning mechanism shown coupled to the cable end of FIG. 7.

With reference to FIGS. 16-18, the second wheel 114 is ring-shaped and configured to be positioned circumferentially about the first wheel 112 between the flanged end 116 and the annular groove 122. The locking ring 124 may be used to secure the second wheel 114 to the first wheel 112 so the second wheel 114 is rotatable relative to the first wheel 112. An outer peripheral surface of the second wheel 114 may be knurled or otherwise textured to provide for optimum gripping force when rotating the tensioning mechanism 110.

The second wheel 114 houses a detent 126 that includes a pin 128 extending inwardly. The pin 128 is biased in an inwardly extended position with a spring 130. The pin 128 is sized to engage with the recesses 120 of the first wheel 112. The spring 130 has a force suitable to keep the pin 128 engaged with the radially extending portion 123 of one of the recesses 120 so the second wheel 114 is coupled to the first wheel 112 in a way that rotation of the second wheel 114 imparts rotational movement to the first wheel 112 to cause the second cable end 80 to move axially away from the first cable end 78 until a preselected tension is applied to the cable 76. Upon the cable 76 obtaining the preselected tension, the pin 128 compresses the spring 130 to cause the pin 128 to disengage from the recess 120. The process is repeated so long as the second wheel 114 is rotated whereby the second wheel 114 freewheels relative to the first wheel 112. With the cable 76 at the preselected tension, a lock nut 132 is secured to the second cable end 80 to maintain the tensioning mechanism 110 in place. While varying tensions may be applied to the cable 76, it is important not to over-tension the cable 76 in a way that causes excessive lateral forces to be exerted on the bearings, which can result in premature wear and reduced efficiency.

The first wheel retaining assembly 56 and the second wheel retaining assembly 58 may be constructed as described in U.S. Pub. Nos. 2021/03472202 and 2023/0091889, each of which is hereby expressly incorporated herein by reference, and the tether assembly 54 may be constructed as described in U.S. Pat. Nos. 10,987,973 and 11,084,324 and U.S. Pub. No. 2023/0091889, each of which is hereby expressly incorporated herein by reference.

A trailer typically includes eight or more tires, each of which is inflated with air. The large number of tires on any given trailer setup makes it difficult to manually check and maintain the optimum tire pressure for each and every tire. As a result of such problems, automatic tire inflation systems (ATIS) have been developed to automatically monitor the pressure in a vehicle tire and/or inflate the vehicle tire with air to a selected tire pressure as the vehicle is moving.

An ATIS for trailers is designed to maintain proper tire pressure automatically, improving overall safety, fuel efficiency, and tire life. Broadly, an ATIS typically consists of several components: pressure sensors, a central control unit, a source of pressurized air, and a distribution system. Each tire is equipped with a pressure sensor that continuously monitors the air pressure within the tire. These sensors send real-time data to a central control unit, which determines whether each tire is properly inflated or if it needs additional air. The source of pressurized air may be an onboard air compressor that is usually integrated into the trailer's braking system. Pressurized air is distributed from the source to individual tires through a set of hoses and valves. These components regulate the flow of air to each tire. Many automated tire inflation systems use the interior of the axle body 12 as a part of the air distribution system. Others use a conduit or hose that is run through the interior of the axle body 12. From the axle body 12 or a conduit, many automated tire inflation systems utilize rotary unions that transmit air from the axle body 12 or the conduit, both of which are non-rotating, to the rotating tires. In either case, many known automated tire inflation systems utilize the same space within the axle body 12 for distributing air as the inventive concepts disclosed herein.

Figure 19:
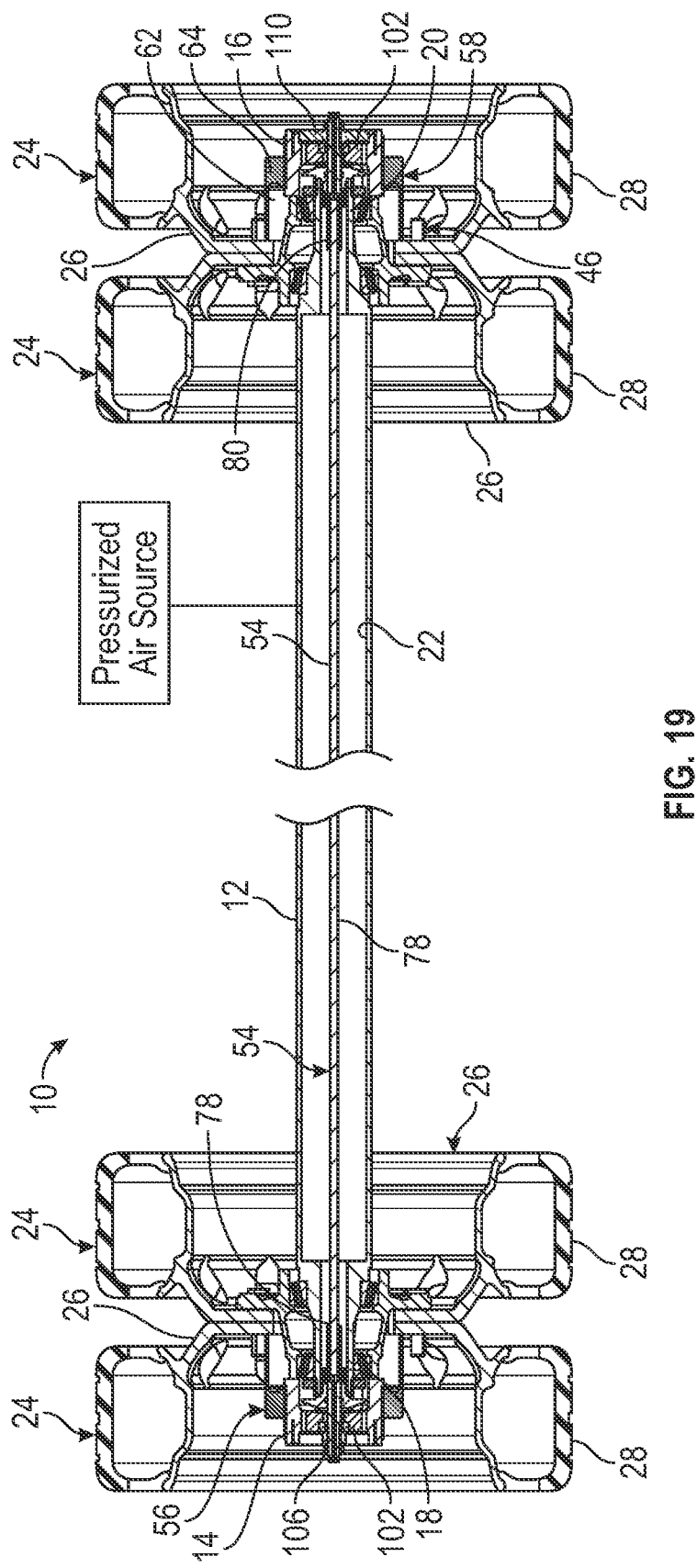
FIG. 19 is a partial diagrammatic, cross-sectional view of the axle assembly of FIG. 1 shown with a pressurized air source for automatically inflating the wheel assemblies mounted thereon.

Referring to FIG. 19, the first cable end 78 and the second cable end 80 are constructed to be incorporated with an ATIS that uses the passage 22 of the axle body 12 as a part of the air distribution system. The bore 90 and the passage 94 of the first cable end 78 and the second cable end 80 that are in fluid communication with the passage 22 of the axle body 12 so the bore 90 and the passage 94 may be used to transport pressurized air from a pressurized air source to the tires 28 in a manner described below.

Each of the second end 88 of the first cable end 78 and second cable end 80 is configured to receive at least one seal member 133, such as an O-ring, that is adapted to sealing receive a stationary tube of a rotary union (not shown). The rotary union may be connected to a hubcap, which is, in turn, connected to the hub member 60 via the holes 75. In one embodiment, the O-ring may be retained by a seal retainer 134 threaded to the second end 88 of the cable ends 78 and 80. As shown in FIGS. 4 and 7, each of the first cable end

78 and the second cable end 80 may also be provided with an air filter 136 disposed in the bore 90 for filtering the air before the air passes into the tires 28.

With the cable 76 secured to the first end 86 of the first cable end 78 and the second cable end 80, respectively, sufficient permeability exists between cable 76 and the first cable end 78 and the second cable end 80 to form air paths that permit the pressurized air in the passage 22 of the axle body 12 to flow around the cable 76, through the air filters 136, and to the second end 88 of the first cable end 78 and the second cable end 80 where the pressurized air passes to a conduit that is part of the rotary union (not shown) and inserted into the second end 90 in sealing contact with the seal member 133. At the same time, this air path remains isolated from the lubricant chamber 50.

Figure 20:
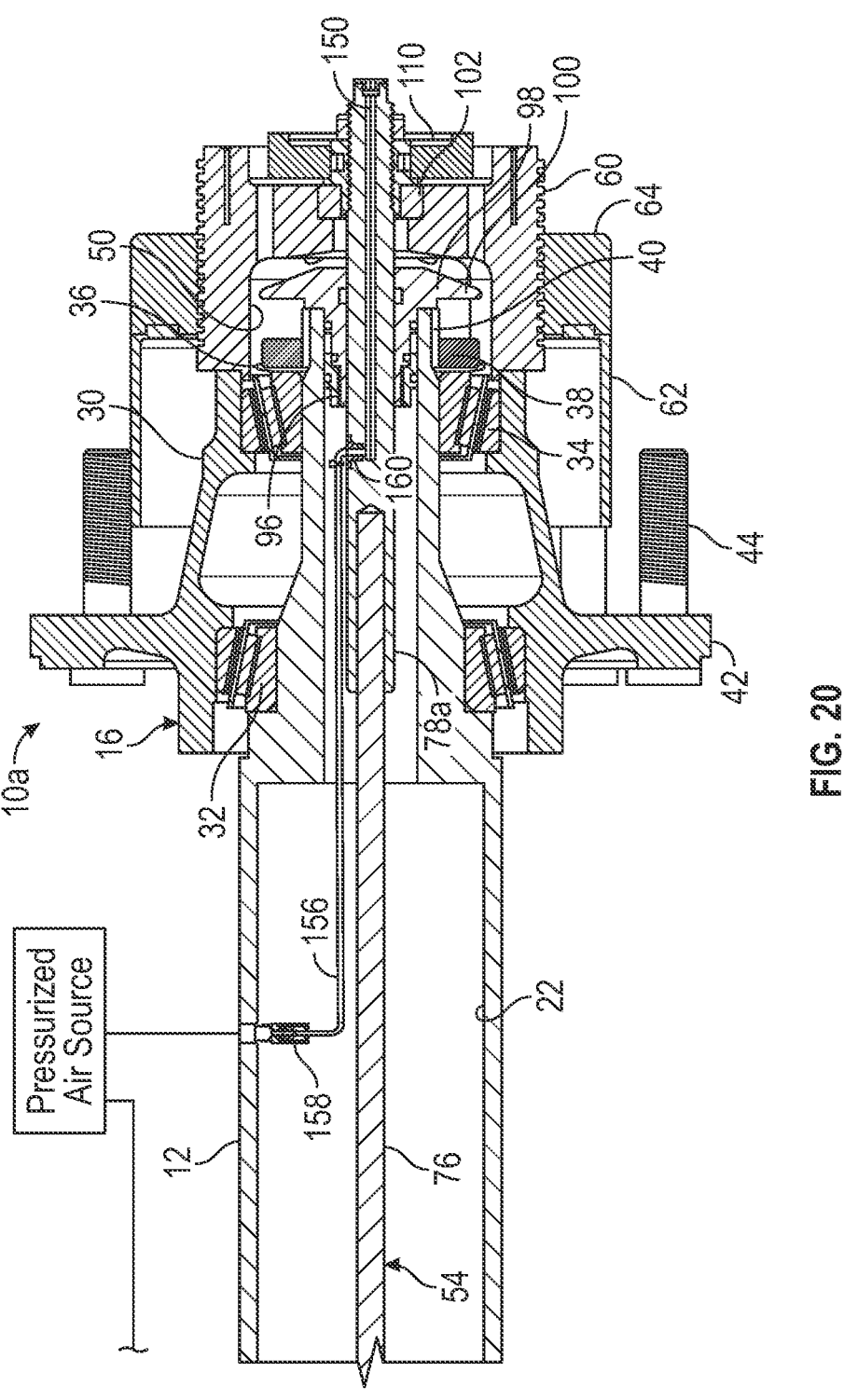
FIG. 20 is a partial diagrammatic, cross-sectional view of another embodiment of an axle assembly shown with a pressurized air source for automatically inflating the wheel assemblies mounted thereon.
Figure 21:
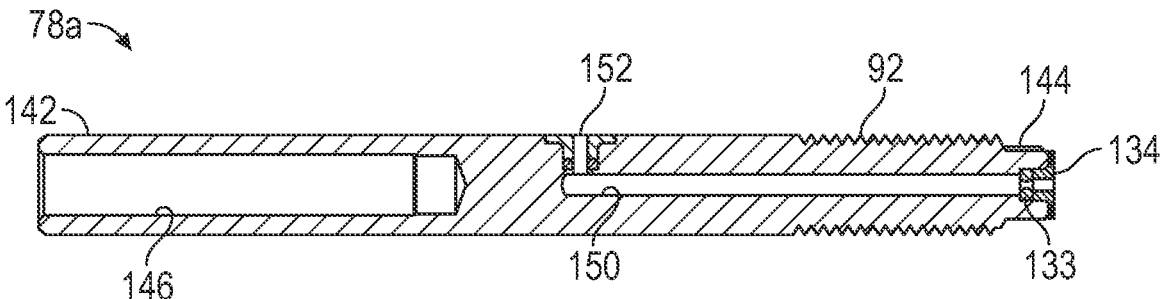
FIG. 21 is a cross-sectional view of another embodiment of a cable end.

FIG. 20 illustrates one end of another embodiment of axle assembly 10a, which is similar in construction and function to the axle assembly 10 described above with reference to FIGS. 1-19, except as discussed below. The axle assembly 10a has a cable end 78a (FIG. 21) constructed to be incorporated with an ATIS that uses a conduit 140 as part of the air distribution system rather than the passage 22 of the axle body 12. It should be noted that a similar cable end is used on the other end of the axle assembly 10a.

The cable end 78a is an elongated member with a first end 142 and a second end 144. The first end 142 has a bore 146 for receiving one end of the cable 76. In one embodiment, the first end 142 of the cable end 144 is secured to the end of the cable 76 by crimping the first end 142 of the cable end 78a. The second end 144 of the cable end 78a may have exterior threads 92 for securing the cable end 78a to the wheel end assembly in the manner discussed above. The cable end 78a has a passage 150 extending through the cable end 78a from the second end 144 toward the first end 142 so the passage 150 is separated from the bore 146.

The second end 144 of the cable end 78a is configured to receive at least one seal member 133, such as an O-ring, that is adapted to sealing receive a portion of a rotary union (not shown). In one embodiment, the O-ring may be retained by a seal retainer 134 threaded to the second end 144 of the cable end 78a.

The cable end 78a is provided with an aperture 152 to create a point of entry into the passage 150. In one embodiment, one or more seals are secured in the aperture 152. To distribute air from the conduit of the ATIS, the cable end 78a further has an air connection conduit 156 (FIG. 20). The air connection conduit 156 has a first end 158 connectable to the axle body 12, such as with a suitable fitting, to define an air inlet, and in turn, connectable to the ATIS, and a second end 160 connectable to the aperture 152, such as by slidably inserting the second end 160 into the aperture 152 of the cable end 78a so the seal forms a fluid-tight seal about the second end 160 of the conduit 156. With the conduit of the ATIS connected to the first end 158 of the conduit 156 and the second end 160 inserted into the aperture 152 of the cable end 78a, an air path is established to permit the pressurized air in the conduit of the ATIS to flow through the conduit 156, through the passage 150 of the cable end 78a, and to the second end 144 of the cable end 78a where the pressurized air passes to a conduit that is part of the rotary union (not shown) and inserted into the second end 144 of the cable end 78a in sealing contact with the seal member 133. At the same time, this air path remains isolated from the lubricant chamber 50. A cable end on the other end of the axle assembly 10a is connected to the ATIS in a similar manner.

From the above description, it is clear that the inventive concepts disclosed and claimed herein are well adapted to carry out the objects and to attain the advantages mentioned herein, as well as those inherent in the invention. While exemplary embodiments of the inventive concepts have been described for purposes of this disclosure, it will be understood that numerous changes may be made which will readily suggest themselves to those skilled in the art and which are accomplished within the spirit of the inventive concepts disclosed and/or defined in the appended claims.

What is claimed is:

1. An apparatus for restraining at least a first wheel assembly and a second wheel assembly mounted on an axle assembly wherein the axle assembly comprises an axle body with a first end, a second end, and a passage extending through the axle body from the first end to the second end, a first wheel end assembly rotatably mounted on the first end of the axle body, and a second wheel end assembly rotatably mounted on the second end of the axle body, the first wheel assembly mountable on the first wheel end assembly and the second wheel assembly mountable on the second wheel end assembly, the apparatus comprising:

a tether assembly extendible through the passage of the axle body and comprising:

a flexible cable having a first end and a second end;

a first cable end attached to the first end of the cable and rotatably securable to the first wheel end assembly; and a second cable end attached to the second end of the cable and rotatably securable to the second wheel end assembly; and a tensioning mechanism coupled to the second cable end, the tensioning mechanism comprising:

a first wheel threadingly connected to the second cable end; and a second wheel rotatably coupled to the first wheel in a way that rotation of the second wheel imparts rotational movement to the first wheel to cause the second cable end to move axially away from the first cable end until a preselected tension is applied to the cable upon which the second wheel freewheels relative to the first wheel.

2. The apparatus of claim 1, wherein the first cable end has a first end, a second end, and a passage extending through the first cable end from the first end to the second end, wherein the passage of the first cable end is in fluid communication with the passage of the axle body when the first cable end is secured to the first wheel end assembly.

3. The apparatus of claim 2, wherein the second cable end is slidably and sealingly connectable to the axle body, wherein the second cable end has a first end, a second end, and a passage extending through the second cable end from the first end of the second cable end to the second end of the second cable end, and wherein the passage of the second cable end is in fluid communication with the passage of the axle body when the second cable end is slidably and sealing connected to axle body.

4. The apparatus of claim 1, wherein the first wheel end assembly comprises a first base hub for receiving at least the first wheel assembly, and wherein the first wheel end assembly further comprises:

a first hub member coaxially connectable to the first base hub and having threads extending along an outer periphery thereof, the first hub member connected to the first cable end so the first hub member is rotatable relative to the first cable end;

a first wheel retainer having an annular rim and positionable over the first base hub so the annular rim of the first wheel retainer is engageable with the first wheel assembly when the first wheel assembly is mounted on the first base hub; and a first wheel retainer nut threadingly engaged with the threads of the first hub member so the first wheel retainer is securable between the first wheel assembly and the first retaining nut.

5. The apparatus of claim 4, wherein the second wheel end assembly comprises a second base hub for receiving at least the second wheel assembly, and wherein the second wheel end assembly further comprises:

a second hub member coaxially connectable to the second base hub and having threads extending along an outer periphery thereof, the second hub member connected to the second cable end so the second hub member is rotatable relative to the second cable end and the second hub member is interconnected to the first hub member via the tether assembly;

a second wheel retainer having an annular rim and positionable over the second hub member so the annular rim of the second wheel retainer is engageable with the second wheel assembly when the second wheel assembly is mounted on the second base hub; and a second wheel retainer nut threadingly engaged with the threads of the second hub member so the second wheel retainer is secured between the second wheel assembly and the second retaining nut.

6. The apparatus of claim 1, wherein the first cable end has a first end, a second end, and a passage extending from the second end toward the first end, and wherein the apparatus further comprises a conduit extendible through at least a portion of the passage of the axle body with a first end connectable to the axle body to define an air inlet and a second end connected to the first cable end so the passage of the first cable end is in fluid communication with the conduit.

7. The apparatus of claim 6, wherein the conduit is a first conduit, wherein the air inlet is a first air inlet, wherein the second cable end has a first end, a second end, and a passage extending from the second end toward the first end, and wherein the apparatus further comprises a second conduit extendible through at least a portion of the passage of the axle body with a first end connectable to the axle body to define a second air inlet and a second end connected to the second cable end so the passage of the second cable end is in fluid communication with the second conduit.

8. An axle assembly, comprising an axle body with a first end, a second end, and a passage extending through the axle body from the first end to the second end;

a first wheel end assembly rotatably mounted on the first end of the axle body and configured to receive at least a first wheel assembly;

a second wheel end assembly rotatably mounted on the second end of the axle body and configured to receive at least a second wheel assembly;

a tether assembly extending through the passage of the axle body and comprising:

a flexible cable having a first end and a second end;

a first cable end attached to the first end of the cable and rotatably attached to the first wheel end assembly; and a second cable end attached to the second end of the cable and rotatably attached to the second wheel end assembly; and a tensioning mechanism coupled to the second cable end, the tensioning mechanism comprising:

a first wheel threadingly connected to the second cable end; and a second wheel rotatably coupled to the first wheel in a way that rotation of the second wheel imparts rotational movement to the first wheel to cause the second cable end to move axially away from the first cable end until a preselected tension is applied to the cable upon which the second wheel freewheels relative to the first wheel.

9. The axle assembly of claim 8, wherein the first cable end has a first end, a second end, and a passage extending through the first cable end from the first end to the second end, wherein the passage of the first cable end is in fluid communication with the passage of the axle body.

10. The axle assembly of claim 9, wherein the second cable end is slidably and sealingly connected to the axle body, wherein the second cable end has a first end, a second end, and a passage extending through the second cable end from the first end of the second cable end to the second end of the cable end, and wherein the passage of the second cable end is in fluid communication with the passage of the axle body.

11. The axle assembly of claim 8, wherein the first wheel end assembly comprises a first base hub for receiving at least the first wheel assembly, and wherein the first wheel end assembly further comprises:

a first hub member coaxially connectable to the first base hub and having threads extending along an outer periphery thereof, the first hub member connected to the first cable end so the first hub member is rotatable relative to the first cable end;

a first wheel retainer having an annular rim and positionable over the first base hub so the annular rim of the first wheel retainer is engageable with the first wheel assembly when the first wheel assembly is mounted on the first base hub; and a first wheel retainer nut threadingly engaged with the threads of the first hub member so the first wheel retainer is securable between the first wheel assembly and the first retaining nut.

12. The axle assembly of claim 11, wherein the second wheel end assembly comprises a second base hub for receiving at least the second wheel assembly, and wherein the second wheel end assembly further comprises:

a second hub member coaxially connectable to the second base hub and having threads extending along an outer periphery thereof, the second hub member connected to the second cable end so the second hub member is rotatable relative to the second cable end and the second hub member is interconnected to the first hub member via the tether assembly;

a second wheel retainer having an annular rim and positionable over the second hub member so the annular rim of the second wheel retainer is engageable with the second wheel assembly when the second wheel assembly is mounted on the second base hub; and a second wheel retainer nut threadingly engaged with the threads of the second hub member so the second wheel retainer is secured between the second wheel assembly and the second retaining nut.

13. The axle assembly of claim 8, wherein the first cable end has a first end, a second end, and a passage extending from the second end toward the first end, and wherein the apparatus further comprises a conduit extendible through at least a portion of the passage of the axle body with a first end connectable to the axle body to define an air inlet and a second end connected to the first cable end so the passage of the first cable end is in fluid communication with the conduit.

14. The axle assembly of claim 13, wherein the conduit is a first conduit, wherein the air inlet is a first air inlet, wherein the second cable end has a first end, a second end, and a passage extending from the second end toward the first end, and wherein the apparatus further comprises a second conduit extendible through at least a portion of the passage of the axle body with a first end connectable to the axle body to define a second air inlet and a second end connected to the second cable end so the passage of the second cable end is in fluid communication with the second conduit.

15. A method of restraining at least a first wheel assembly and a second wheel assembly mounted on an axle assembly comprising an axle body with a first end, a second end, and a passage extending through the axle body from the first end to the second end, a first wheel end assembly rotatably mounted on the first end of the axle body, and a second wheel end assembly rotatably mounted on the second end of the axle body, each of the first wheel end assembly and the second wheel assembly having a base hub, the first wheel assembly mounted on the first wheel end assembly and the second wheel assembly mounted on the second wheel end assembly, the method comprising:

extending a tether assembly through the passage of the axle body, the tether assembly comprising a flexible cable having a first end and a second end, a first cable end attached to the first end of the cable, and a second cable end attached to the second end of the cable;

rotatably securing the first cable end to the first wheel end assembly; and rotatably securing the second cable end to the second wheel end assembly; and moving the second cable end axially away from the first cable end until a preselected tension is applied to the cable.

16. The method of claim 15, wherein the moving step further comprises:

threadingly connecting a first wheel to the second cable end; and rotating a second wheel that is rotatably coupled to the first wheel to impart rotational movement to the first wheel and cause the second cable end to move axially away from the first cable end until the preselected tension is applied to the cable upon which the second wheel freewheels relative to the first wheel.

17. The method of claim 15, wherein the first wheel end assembly comprises a first base hub for receiving at least the first wheel assembly, wherein the second wheel end assembly comprises a second base hub for receiving at least the second wheel assembly, and wherein the method further comprises:

connecting a first hub member coaxially to the first base hub and to the first cable end so the first hub member is rotatable relative to the first cable end;

securing a first wheel retainer having an annular rim to the first hub member so the annular rim of the first wheel retainer is engaged with the first wheel assembly;

connecting a second hub member coaxially to the second base hub and to the second cable end so the second hub member is rotatable relative to the second cable end component and the second hub member is interconnected to the first hub member via the tether assembly; and securing a second wheel retainer having an annular rim to the second hub member so the annular rim of the second wheel retainer is engaged with the second wheel assembly.

18. The method of claim 17, wherein the step of securing the first wheel retainer comprises:

positioning the first wheel retainer over the first base hub so the annular rim of the first wheel retainer is engaged with the first wheel assembly, the first hub member having threads extending along an outer periphery thereof; and threadingly engaging a first wheel retainer nut with the threads of the first hub member so the first wheel retainer is secured between the first wheel assembly and the first retaining nut.

19. The method of claim 18, wherein the first wheel retainer nut comprises a split-ring and wherein the step of threadingly engaging the first wheel retainer nut further comprises securing the split-ring together thereby securing the first wheel retainer nut to the first hub member.

20. The method of claim 17, wherein the step of securing the second wheel retainer comprises:

positioning the second wheel retainer over the second hub member so the annular rim of the second wheel retainer is engaged with the second wheel assembly, the second hub member having threads extending along an outer periphery thereof; and threadingly engaging a second wheel retainer nut with the threads of the second hub member so the second wheel retainer is secured between the second wheel assembly and the second retaining nut.

\* \* \* \* \*